United States Patent [19]

Berg

[11] Patent Number: 4,884,664

[45] Date of Patent: Dec. 5, 1989

[54] AUTOMOTIVE WEDGE GUIDE

[76] Inventor: Brian K. Berg, 8247 Doris St., San Gabriel, Calif. 91775

[21] Appl. No.: 289,261

[22] Filed: Dec. 23, 1988

[51] Int. Cl.$^4$ ................................................ B60T 3/00
[52] U.S. Cl. ........................................ 188/32; 248/75; D12/217
[58] Field of Search ............................ 188/32, 36, 4 R; 248/75, 76, 352; D12/217

[56] References Cited

U.S. PATENT DOCUMENTS

| 1,082,807 | 12/1913 | Holworthy | 188/32 |
| 2,822,063 | 2/1958 | Hampton | 188/32 |
| 3,754,305 | 8/1973 | Kline | 248/75 |
| 3,993,167 | 11/1976 | Reed | 188/32 |
| 4,778,135 | 10/1988 | Legard | 188/32 |
| 4,781,271 | 11/1988 | Wokeck | 188/32 |

Primary Examiner—George E. A. Halvosa
Attorney, Agent, or Firm—Leon Gilden

[57] ABSTRACT

An automotive wedge guide is set forth for securement adjacent a forward exterior tread surface of an automotive wheel to present a guide surface to prevent a garden-type hose from binding between the automotive tread and the support surface of the automobile tire and avoid binding of the garden hose during a washing procedure of an automobile.

1 Claim, 1 Drawing Sheet

U.S. Patent	Dec. 5, 1989	4,884,664
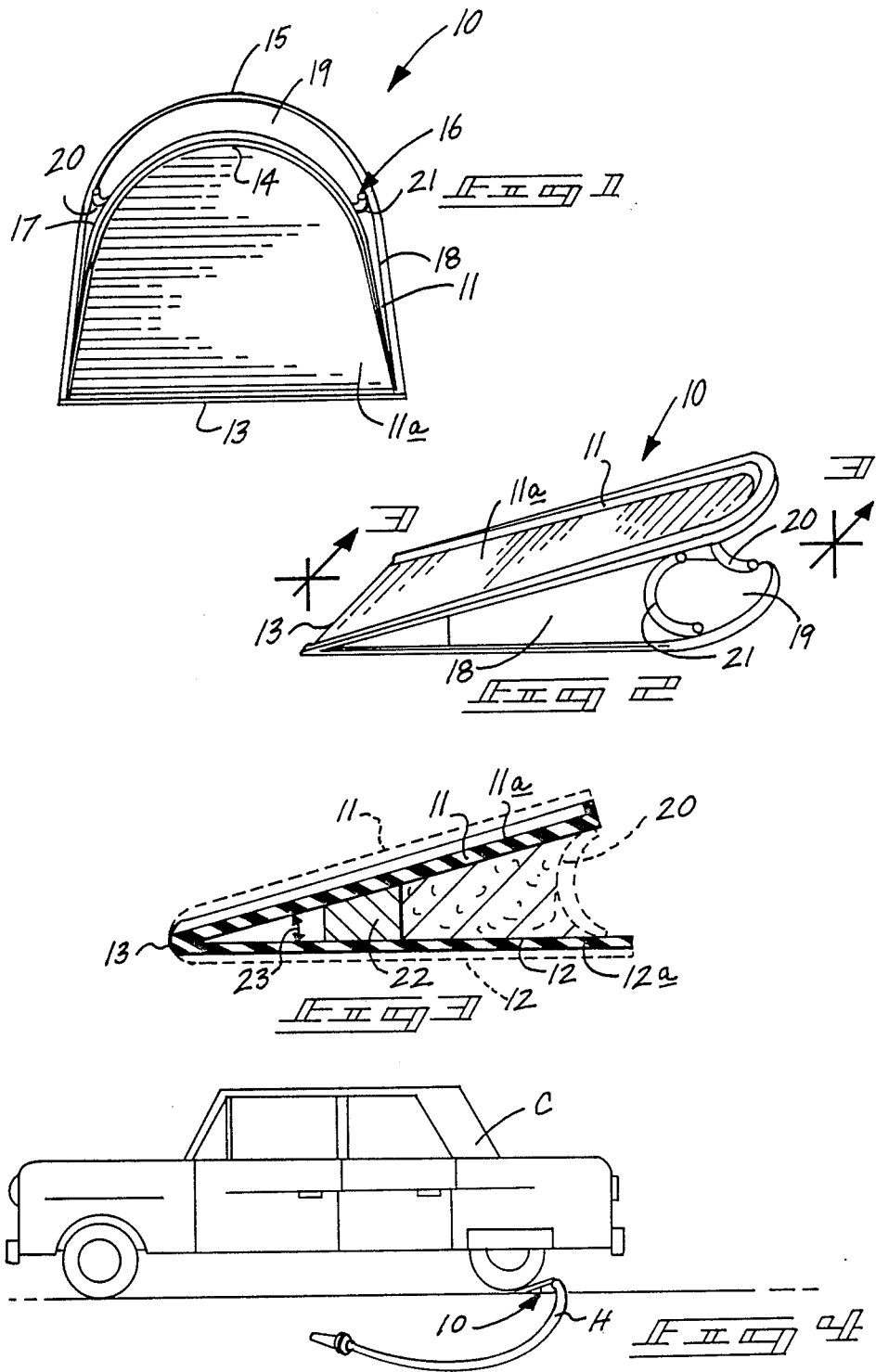

AUTOMOTIVE WEDGE GUIDE

BACKGROUND OF THE INVENTION

1. Field of the Invention

The field of invention relates to automotive washing accessories, and more particularly pertains to a new and improved automotive wedge guide for securement adjacent an automobile's tire tread surface to present a guide preventing binding of a water hose during a washing operation of an automobile.

2. Description of the Prior Art

Wedges of various types have been utilized in association with automobile tires to provide an abutment for an automobile tire preventing undesirable motion of the automobile. Accordingly, wedges of the prior art have not been concerned with the problems associated with an automobile washing procedure wherein the wedges heretofore provided have accommodated a goal of preventing undesirable rolling of an automobile. For example, U.S. Pat. No. 4,109,768 to Sugino sets forth a wheel stop wedge apparatus wherein an upper surface of the wedge is sloped and pivotally mounted to a lower planar surface. A connecting plate is releasably mounted to space the upper surface to the lower surface during use.

U.S. Pat. No. 4,186 823 to White sets forth an automotive wheel wedge wherein a plurality of traction rib portions extend across a first surface of the wedge with cylindrical portions across a second surface to provide alternative engagement portions for positionment against a support surface depending upon weather conditions. The wedge is provided with an internal cavity to enable collapse of the wedge and enhance engagement with an associated wheel while the instant invention provides for generally spaced rigid faces with a third face and side surfaces of resilient construction to enable collapse of these limited surfaces upon a water hose engagement with the surfaces.

U.S. Pat. No. 4,582,176 to Roberts sets forth a wedge wheel block for use with truck wheels including additional engagement structure including a flexible chain and the like for preventing disassociation of the wedge from a blocking relationship with an associated truck.

U.S. Pat. No. 4,711,325 to Mountz sets forth a wheel truck assembly comprising a plurality of wedges positionable in a spaced relationship and interconnected by a bar to maintain the spaced relationship of the wedges about an associated wheel.

As such, it may be appreciated that there is a continuing need for a new and improved automotive wedge guide which addresses both the problems of effectiveness and compactness of organization in providing a guide surface about an associated automotive wheel to enable sliding passage of an associated water hose relative to the automotive wheel, and in this respect, the present invention substantially fulfills this need.

SUMMARY OF THE INVENTION

In view of the foregoing disadvantages inherent in the known types of automotive tire wedges now present in the prior art, the present invention provides a automotive wedge guide wherein the same may be conveniently and readily positioned adjacent an automotive wheel to enable sliding engagement of a water bearing hose relative to the wheel to prevent binding of the hose and may be further easily and efficiently stored during periods of non-use. As such, the general purpose of the present invention, which will be described subsequently in greater detail, is to provide a new and improved automotive wedge guide which has all the advantages of the prior art automobile wedge devices and none of the disadvantages.

To attain this, the present invention comprises an automotive wedge guide which includes top and bottom diverging surfaces formed of relatively rigid material with frictional laminate thereon to enhance frictional engagement with a support surface and an automotive wheel. An internal rib organization maintains the spacing of the top and bottom surfaces. The rear and side surfaces are formed of a relatively deformable material including semi-circular hooks to accommodate guidance and enhance sliding engagement with the wedge guide. The rear and side surfaces are deformable wherein &he semicircular guides are retractable with the rear and side surfaces and may be compressibly positioned between the top and bottom surfaces to accommodate various angulations of a water conveying hose slidingly engaging the rear and side surface portions of the wedge guide.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive wedge guide apparatus which has all the advantages of the prior art automotive wedge guide apparatus and none of the disadvantages.

It is another object of the present invention to provide a new and improved automotive wedge guide apparatus which may be easily and efficiently manufactured and marketed.

It is a further object of the present invention to provide a new and improved automotive wedge guide apparatus which is of a durable and reliable construction.

An even further object of the present invention is to provide a new and improved automotive wedge guide apparatus which is susceptible of a low cost of manufacture with regard to both materials and labor, and which accordingly is then susceptible of low prices of sale to the consuming public, thereby making such automotive wedge guide apparatus economically available to the buying public.

Still yet another object of the present invention is to provide a new and improved automotive wedge guide apparatus which provides in the apparatuses and methods of the prior art some of the advantages thereof, while simultaneously overcoming some of the disadvantages normally associated therewith.

Still another object of the present invention is to provide a new and improved automotive wedge guide wherein the same may be conveniently positioned adjacent an automotive wheel to enable deformable and sliding contact to a water conveying hose to prevent binding and engagement of the hose with the associated automotive wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the instant invention.

FIG. 2 is an isometric illustration of the instant invention.

FIG. 3 is an orthographic view taken along the lines 3—3 of FIG. 2 in the direction indicated by the arrows.

FIG. 4 is an isometric illustration of the instant invention in a working environment.

DESCRIPTION OF THE PREFERRED EMBODIMENT

With reference now to the drawings, and in particular to FIGS. 1 to 4 thereof, a new and improved automotive wedge guide embodying the principles and concepts of the present invention and generally designated by the reference numeral 10 will be described.

More specifically, it will be noted that the automotive wedge guide apparatus 10 essentially comprises a wedge shaped member formed with a planar top surface 11 angularly oriented to a bottom surface 12 merging at a common juncture line 13. The top and bottom surfaces 11 and 12 are formed of a relatively rigid material and wherein the top surface 11 is formed with a top friction laminate 11a with the bottom surface 12 formed with a corresponding bottom friction laminate 12a for enhanced engagement to provide a non-slip surface between an associated support surface and automotive tire, as illustrated in FIG. 4 for example.

The respective top and bottom surfaces 11 and 12 are formed with respective top arcuate rear perimeter 14 and a bottom arcuate rear perimeter 15. The arcuate rear perimeters and associated arcuate surface defined therebetween enhance a non-slip and non-binding relationship between the noted surfaces and a respective garden hose "H" to be typically pulled slidingly against the surfaces. There is defined a central compressible portion 16 between the top and bottom surfaces 11 and 12 formed of a relatively compressible material defined by first and second respective side surfaces 17 and 18 merging into an arcuate rear surface 19. Integrally formed to the central compressible portion 16 at its outer surface thereof are first and second semi-circular rigid guides 20 and 21. The guides 20 and 21 are of a diameter less than that defined between distance between the top and bottom surfaces 11 and 12 where positioned on the central to enable retraction of the semi-circular guides 20 and 21 between the top and bottom surfaces 11 and 12 upon compression of the portion 16. This enables a garden hose "H" or equivalent flexible water conduit to be tightly drawn against the central portion 16 at various angles thereto and maintain a sliding relationship with the central portion 16 and the associated guides 20 and 21 which maintain the hose "H" in a predetermined relationship and engagement with the wedge guide 10.

The top and bottom planar surfaces are maintained in a predetermined angular relationship by an included central rib portion 22, as illustrated in FIG. 3, to maintain the rigid surfaces at a predetermined angle therebetween. Specifically, a forty-five degree angle 23 has been found to provide an optimum spaced relationship and enable compression of the central portion 16 and its associated guide function.

As to the manner of usage and operation of the instant invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive wedge guide comprising,
   a top rigid surface angularly joined at a common forward junction line to a bottom rigid surface, and
   a central portion defined between said top and bottom surfaces formed with a compressible material, and
   a plurality of guide members secured to and extending outwardly of said central portion, and
   wherein said top and bottom surfaces are planar and formed of relatively rigid material relative to said compressible central portion, and wherein said top and bottom surfaces have laminated thereto respective top and bottom friction surfaces, and wherein said respective top and bottom surfaces are formed with arcuate rear perimeters defining an arcuate rear central portion therebetween to provide a curvilinear guide surface, and wherein said guide members comprise semi-circular rigid members positioned at a spacing on said central portion defining a diameter less than that of the spacing between said top and bottom rigid surfaces when said central portion is in a non-compressed configuration, and wherein said top and bottom surfaces are angularly oriented relative to one another at substantially forty-five degrees.

* * * * *